Dec. 22, 1970 R. A. HEDIN ET AL Re. 27,013
KEY-ACTUATED ELECTRONIC SECURITY SYSTEM
Original Filed Oct. 23, 1965
Fig. 1
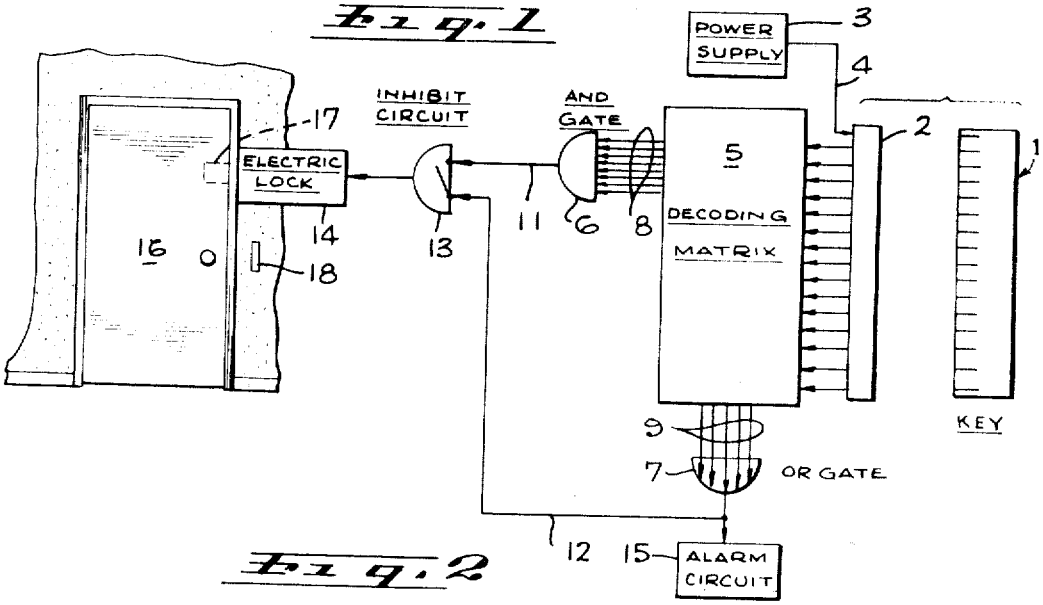
Fig. 2
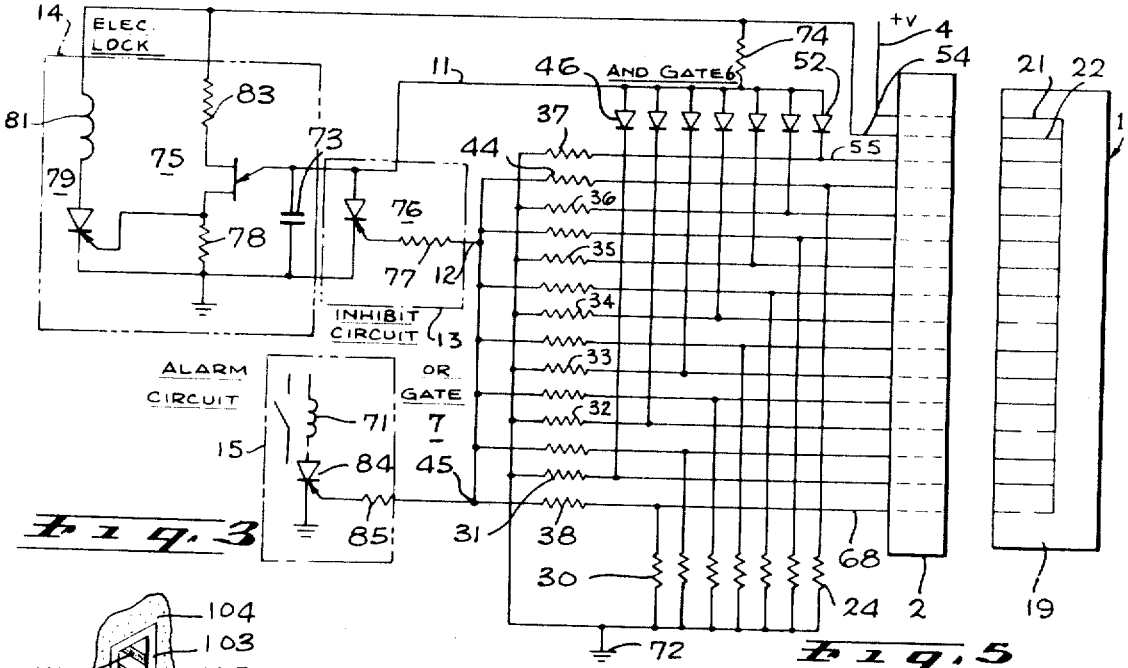
Fig. 3
Fig. 4
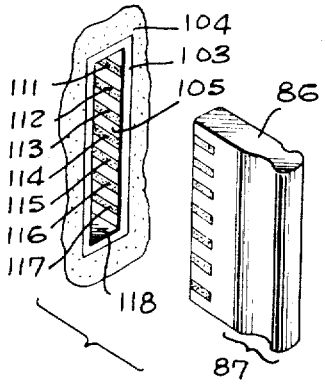
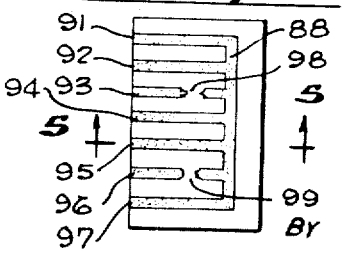
Fig. 5
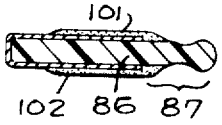
INVENTORS
ROBERT A. HEDIN
ALFIERO F. BALZANO
BY Teagno & Teddy
ATTORNEYS

United States Patent Office

Re. 27,013
Reissued Dec. 22, 1970

27,013
KEY-ACTUATED ELECTRONIC SECURITY SYSTEM

Robert A. Hedin, San Pedro, and Alfiero F. Balzano, Placentia, Calif., assignors to Digital Identification Systems, Inc., Sun Valley, Calif., a corporation of California

Original No. 3,392,558, dated July 16, 1968, Ser. No. 503,888, Oct. 23, 1965. Application for reissue Dec. 29, 1969, Ser. No. 888,183

Int. Cl. E05b *47/04;* G07c *1/32;* H01h *47/14*

U.S. Cl. 70—277 16 Claims

Matter enclosed in heavy brackets [ ] appears in the original patent but forms no part of this reissue specification; matter printed in italics indicates the additions made by reissue.

ABSTRACT OF THE DISCLOSURE

The [electronic lock and] key-*actuated electronic security* system disclosed herein includes key means for establishing a binary *code* permutation [code] which may be electrically sensed and means responsive to the key means for transmitting the code to a plurality of output lines. An AND gate is provided having a plurality of inputs, each of which is connected *by a decoding matrix* to corresponding ones of said output lines and which is responsive to the binary [permutation code] *code permutation* to produce a first output signal. An OR gate having a plurality of inputs is provided each of which is connected *by the matrix* to a corresponding one of the output lines and which is responsive to a disparity in the binary [permutation code] *code permutation* to produce a second output signal. Also included is an INHIBIT gate having its inputs connected to the output of the AND gate and the output of the OR gate *and* which is responsive to the presence of the first output signal and the concurrent absence of the second output signal to produce a control signal. Electrically actuated lock means are connected to the output of the INHIBIT gate and operative in response to the control signal.

This invention relates to lock apparatus such as may be used for entrance doors, vaults, and the like, and more particularly to [an electronic lock and] *a key-actuated electronic security* system employing *a key having* contacts which are permuted in a [biinary] *binary* code to implement various combinations of keys and [locks] *key-responsive means.*

There have been proposed, heretofore, various schemes for constructing electronic permutation locks. Typically, these prior schemes have employed frequency responsive lock circuits which are designed to coact with a key device capable of establishing a particular frequency or combination of frequencies in order to unlock the latching mechanism. While such devices have provided a number of desirable features, including a large number of available combinations, they have failed to achieve any substantial commercial success due to their excessive complexity, large size, high cost and inadequate reliability. Also, they have, for the most part, lacked flexibility with respect to encoding or re-encoding the keying device. The present invention overcomes these shortcomings of prior devices and also provides a number of advantages over devices heretofore intended for generally similar purposes.

The system of the invention compriss a key or keying device which is adapted to mate with a corresponding [lock] receptacle in order to complete a plurality of circuit paths in accordance with a preselected binary code. The circuit paths [of] *connected by* the *key* [lock] receptacle [communicates] *communicate* with a decoding matrix and its associated logic circuitry. The matrix and logic circuit provides an output signal to an electromechanical latch device whenever the proper key is inserted in the receptacle and, if desired, provides an output signal to an alarm device whenever an improper key is inserted in the receptacle. The use of a binary code in permuting the circuit paths through the key and its [lock] receptacle permits a very large number of combinations to be achieved. The number of combinations available may be expressed as follows:

$$\text{Total combinations}=\frac{n!}{r!(n-r)!}$$

where n is the number of available circuit paths and r is the number of closed circuit paths required to energize the electromechanical latch.

Inasmuch as the operation of the lock depends on the closure of appropriate circuit paths, redundancy may be incorporated into the system in the form of a plurality of key receptacles for a single key, and/or remote operation either by means of an additional lock station or by means of a set of push-button switches which, when depressed in an appropriate manner, will complete the key circuit paths in a manner analogous to the key itself.

In a typical installation of the system of the present invention, the key receptacle is located in a conveniently exposed position adjacent the door which is to be locked. A cable having a plurality of labeled conductors extends from the key receptacle to the lock decoding and logic circuts. This arrangement permits these circuits to be located in a secure place which is inaccessible to unauthorized persons. However, the construction of the invention, as will be seen hereinafter, permits an authorized person to readily change the key code and provide a corresponding key. Other modifications are also possible. For example, many levels of master keys may be provided as in the case of an [aparatment] *apartment* building wherein all tenants are provided with a key which will unlock the main entrance to the building, but which key will also unlock but a single one of the several apartments within the building. This same key may be further adapted to open a particular door within the given apartment whereas other keys adapted to open this same given apartment would not provide access to this particular door.

Having in mind the defects of prior art electrical lock devices, it is an object of this invention to provide *a key-actuated electronic security system, i.e.,* an electronic lock and key system which overcomes the difficulties and disadvantages of such prior devices.

Another object of this invention is to provide a novel and improved electronic lock and key system which is simpler in structure, more reliable in operation, and more compact in size than similar devices heretofore known in the art.

Still another object of this invention is to provide a novel and improved electronic lock and key system utilizing a binary code in the permutation of the key codes.

Yet another object of this invention is to provide a novel and improved binary coded electronic lock and key system having an alarm which is responsive to the insertion of an unauthorized key into the lock.

It is still another object of this invention to provide a novel and improved binary coded electronic lock and key system which is sufficiently flexible to permit redundant operation, and/or the use of a number of levels of master keys.

Other objects, features, and advantages of this invention will in part be obvious and will in part appear hereinafter.

Many variations will become obvious in this invention to those versed in the art upon consideration of the following specification and drawings in which:

FIGURE 1 diagrammatically illustrates a typical lock and key system constructed in accordance with the present invention.

FIGURE 2 is a schematic circuit diagram of the decoding and logic circuits of the apparatus of FIGURE 1.

FIGURE 3 is a perspective detail view of a key and its corresponding [lock] receptacle constructed in accordance with the invention.

FIGURE 4 is a side elevational view of the contact portion of the key of FIGURE 3.

FIGURE 5 is a cross-sectional view, taken along the 5—5, of the device of FIGURE 4.

Referring now to FIGURE 1, there is shown a key 1 which is adapted to engage and mate with [lock] receptacle 2. Structural details of the key 1 and [lock] receptacle 2 will be described more completely hereinafter in connection with FIGURES 3–5. The portion of the system shown in FIGURE 1 which is responsive to *the* key, is shown as applied to the operation of a door lock. It should be understood, however, that the invention need not be so limited. That is, when the correct key is inserted into the [lock] receptacle, an electrical signal is generated which may be used for any purpose such as turning on lights, starting a camera or recorder, etc. Key 1 is provided with a plurality of conductors, *later to be described,* which serve as selective circuit paths between individual mating terminals at the [lock]receptacle. That is, these conductor paths are permuted in desired combinations of open and closed circuits. When the key 1 is inserted in the [lock] receptacle 2, the voltage from *a* power supply 3, appearing on *a* line 4, is applied simultaneously to a common connection to all of the conductors on the key 1. However, selected ones of the conductors are broken or interrupted in order to cause open circuits in accordance with the encoded key combination. In those instances in which there is a closed circuit path through the conductors on the key, the power supply voltage will appear at the corresponding terminals of the [lock] receptacle 2 and be transmitted to [the] *a* decoding matrix 5. In this way certain inputs of the decoding matrix 5 will be energized in accordance with the combination encoded in the key 1. The decoding matrix 5 is designed to match a particular key, *i.e., one having a preselected binary code permutation* so that all inputs to [the] *an* AND gate 6 at the output of the decoding matrix 5 will be true (energized) and no inputs to [the] *an* OR gate 7 will be true. The inputs to AND [gates] *gate* 6 are indicated at 8, and the inputs to OR gate 7 are indicated generally at 9. This arrangement will result in an output from the AND gate 6, on *a* line 11, when the proper key is inserted in the *receptacle 2* [lock], and *in certain instances* will further result in an output on *a* line 12 from the OR gate 7 when any key other than the proper key is inserted in the [lock] *receptacle.*

An output on line 11 from the AND gate 6 is supplied as the signal input to *an* inhibit *circuit or* gate [6] *13.* The inhibit input to inhibit gate 13 is obtained from the output (line 12) of the OR gate 7. If other than the proper [combinations] *combination* of input conductors to the decoding *matrix* [martix] 5 are energized there will be no output on line 11 from the AND gate 6[.], [or] *and either simultaneously or alternatively* [Therefore,] there will be a true condition at the inputs 9 to the OR gate 7 and a signal will be supplied on line 12 from the output of the OR gate 7 to the inhibit input of the inhibit gate 13. The presence of the inhibit signal on line 12 will prevent [the] *an* electric lock 14 from being energized *for release movement* and will also result in *an* alarm circuit 15 being triggered.

Electric lock 14 is any suitable and well-known electromagnetically controlled mechanism for latching and unlatching *a* door 16. [The] *A* latching bar is generally indicated at 17, and the location of receptacle 2 with respect to door 16 is indicated at 18.

In a typical construction there may be provided 21 conductors on the key 1. This will make possible $2^{20}$ code permutations (one conductor is connected directly to the power supply voltage). Gates 6, 7 and 13 may be any of the suitable and well-known devices for performing their respective functions, well-known in the art. Examples of suitable circuits will be described hereinafter.

Looking at FIGURE 2, there is shown a schematic circuit diagram of a system of the type described above in connection with FIGURE 1. The key comprises an insulator *or non-conductive member* 19 upon which is carried a plurality of key conductors of which 21 and 22 are typical. The key is adapted to mate with [lock] receptacle 2 [3] having a plurality of output leads which connect to the decoding matrix. The decoding matrix comprises resistors 24–37 all of which have a common ground connection, resistors 38–44 which are connected in common to *a* point 45, *and* diodes 46–52 having their anodes connected in common. [The] *Line 4 is interconnected with the* positive power supply terminal [53 will] *so as to* connect one or more of lines 54–68 *to the supply potential* depending upon the pattern of closed-circuit conductors on the key. Resistors 24–30 and 31–37 are all of the same value. Resistors 38–44 are of a larger value and comprise the OR gate which operates the inhibit circuit [69] *13* and *an* alarm relay 71 [for] *when* one or more of resistors 38–44 are connected to the power supply *via line 4* [terminal 53] through one or more conductors [(e.g., 21–22)] of the key. *As those skilled in the art will recognize, the AND gate 6 is constituted by diodes 46–52 and resistors 31–37 and 74.*

The resistors 24–[37]*30* isolate [the] inputs [54] *55–68* of the decoding matrix to prevent the resistance between conductors of the key from being detected.

Each contact on the key receptacle corresponding with a closed circuit on [the key] *a key that is a proper key* is connected to a particular resistor (*31–37*) [of the decoding matrix], which is of the same value as the resistors on the open contacts, and the cathode side of one of the diodes 46–52.

The other terminus of each of these resistors is connected to ground 72 (the negative terminal of the power supply) and *thus these resistors* [acts] *act* as [the] pull-down [resistor] *resistors* for the diode AND gate. When all of the cathodes of the diodes comprising the AND gate are receiving the power supply potential, in response to the insertion of the key, *a* capacitor 73 will begin charging toward the power supply voltage through resistor 74. This action will cause *a* unijunction transistor 75 to fire when the voltage on *a* capacitor 73 reaches the firing potential of [silicon controlled rectifier] *unijunction transistor 75.* [(SCR) 76.] The gate electrode of *an* SCR 76 is connected to point 45 via *a* resistor 77. *SCR 76 and resistor 77 constitute the inhibit gate or circuit 13. SCR 76 is triggered by an OR gate output signal to inhibit charging of capacitor 73 and thus inhibit the AND gate output signal.* Unijunction transistor 75 is referenced to the power supply [in] *through a* resistor 83. Capacitor 73 then discharges through *a* resistor 78 and triggers [the silicon] *an* [controlled rectifier] *SCR* 79. Upon firing, [silicon controlled rectifier] *SCR* 79 will permit the conduction of current to the coil 81 of electric [latch 82] *lock 14* thereby operating the mechanism for *permitting* opening *of* the door.

The alarm circuit is controlled by *an* SCR 84 which has its gate electrode connected to the output of the OR gate via *a* resistor 85[.] *and thus SCR 84 will be triggered by an output signal from the OR gate to energize a relay coil 71 for giving an alarm.*

Referring now to FIGURES 3–5, there are shown additional details of the [lock] receptacle and key structure. As can be seen in FIGURE 3, the key comprises an insulator 86, *i.e., an electrically non-conductive member,* which is preferably formed to have a handle portion 87 to facilitate its insertion and removal from the [lock]

receptacle. Insulator 86 may comprise a plastic or ceramic material and its overall size is preferably comparable to a conventional key as used with pin tumbler locks or the like. The conductors which comprise the coding means are wrapped around three sides of insulator 86. [and are disposed in a plurality of vertically spaced] *As may be seen in FIGURES 3 and 4, the conductors 91–97, which are relatively thin, flat strips, are mounted in vertically spaced relation to one another on the surface of insulator 86 viewed in FIGURE 4 and extend across a portion of the surface in generally parallel relationship toward the left-hand edge substantially at right angles thereto. Each of the conductors extends relatively remotely from the left-hand edge toward a common conductor 88, but only some of the conductors 91–97 are connected electrically in common by means of the common conductor to provide the key with a binary code permutation of closed and open circuits. The common conductor 88, as may be seen, extends transversely across the remote ends of conductors 91–97 generally parallel to the left-hand edge of insulator 86.* [rows.] For the sake of clarity and simplicity, the embodiment shown in FIGURES 3 and 4 has but seven of these [vertical rows of] *vertically spaced* conductors, indicated at 91–97. [Each of these conductors is connected to a vertically extending common conductor 88, disposed along one end of each row.] The end of each [row on] *conductor wrapped around the edge to* the side not shown in FIGURE 4 is left open—there being no common conductor on the opposite side of insulator 86.

While there are but seven conductors in the embodiment of FIGURES 3–5, it should be understood that many more conductors could be employed, as for example the 21 conductors mentioned hereinabove as being capable of providing $2^{20}$ key combinations. The conductors 91–97 may be deposited on the insulator by any one of the several techniques commonly used for fabricating etched or printed circuits. Encoding of the key is accomplished by making an electrical discontinuity in selected ones of the several conductors 91–97. [Suc] *Such* discontinuities are indicated at 98 and 99 in FIGURE 4 and are made by physically removing an amount of the conductive material sufficient to sever the electrical circuit path therethrough. It is this presence or absence of a conductive path which establishes a binary type of code.

As can be seen in the cross-sectional view of FIGURE 5, there is provided an insulating overlayer which covers the portion of the conductors 91–97 in which the discontinuities 98 and 99 are located. Two such overlayers (101 and 102) are provided, one on each face of the key and serve to obscure the coded area and to provide a bearing surface when the key is inserted into the lock receptacle. These overlayers (101 and 102) may be fabricated from and opaque, non-conductive plastic, having a low coefficient of friction. It should be understood, of course, that the overlayers (101 and 102) have been deleted in FIGURE 4 to show the manner of encoding the key.

The [lock] receptacle comprises an insulated receiving member 103 of complementary size and shape with respect to the key, and which is adapted to be flush-mounted in a wall 104. One vertical interior wall 105 carries a plurality of spaced apart conductors 111–117 which are adapted to come in contact with corresponding ones of conductors 91–97 when the key is inserted in the lock. Conductor 111, for example, may be connected directly to the power supply and therefore will energize conductor 91 when the key is in the lock. As a consequence, conductors 112, 114, 115 and 117 will be energized via common conductor 88 and corresponding conductors 92, 94, 95 and 97. Conductors 113 and 116 will not be energized due to the discontinuities in corresponding conductors 93 and 96. The decoding matrix connected to conductors 111–117 would be suitably wired to require energization of conductors 112, 114, 115 and 117 but not conductors 113 and 116 in order to energize the AND gate at the matrix output[.], *it being apparent that conductors 113 and 116 may be connected to OR gate inputs. In this way, conductors 111–117 are interconnected with the AND gate and OR gate inputs in accordance with a preselected binary code permutation.*

The spacing between the lowermost conductor 117 and the bottom interior wall 118 may be such as to render the key inoperative if inserted in an inverted position. Other schemes for assuring proper orientation and alignment of the key with respect to the [lock] receptacle will be obvious to those skilled in the art. Also, other shapes and dimensions of the device may be made without departing from the intended scope of this invention.

Inasmuch as the key transfers voltage from a supply conductor to a plurality of matrix conductors, and since the decoding and logic circuitry has not other connection to the power supply except through the key, it becomes possible to operate the lock by means of an external power supply, connected via the key receptacle, in the event of a failure of the regular power supply. That is, a special key having a battery supplied to the common power supply conductor and to the ground reference of the system will operate the lock in a normal manner, notwithstanding the failure of the built-in power supply. Also, it will be seen that power dissipation is zero throughout the system until the key is inserted into the [lock.] *receptacle.*

Other modifications of the basic invention will become apparent to those skilled in the art. For example, since the decoding matrix and its output gates are analogous to a truth table, various combinations of codes may be employed to satisfy the circuits output. Thus, by providing keys with extra sets of conductors, master and sub-master key systems may be implemented. If it is desired to have separate keys operate a given lock, each such key will be provided with more true or closed-circuit conductors than necessary to operate the given lock. The lines from these extra closed-circuit conductors[,] must then be disconnected from the inhibit circuit for proper operation. Thus, each key that operates this given lock can be different. This also makes it possible to give a unique indication or record as to which key has been used or who has operated the lock, and at what time. Since the locks of the owner of a particular key require all inputs to the matrix to be correct, none of the keys that open a common lock will open this particular lock.

The circuits of the lock lend themselves ideally to fabrication by techniques of micro-miniaturization or integrated circuitry, thus affording locks of a size competitive with, or smaller than, the smallest mechanical locks.

From the foregoing it will be seen that there is provided a key and lock system which is responsive to a binary input code to activate either an AND gate—and thereby open the lock—or an OR gate—and thereby bar opening of the lock and optionally trigger an alarm. Means other than the presence or absence of conductive paths on the key may be used to establish the input code.

While the invention has been illustrated and described in terms of a particular embodiment, it is not intended to be limited to the details shown, since various modifications, omissions, and structural changes may be made without departing in any way from the actual scope of the invention. It is, therefore, intended that the invention be limited only by the following claims.

What is claimed is:

[1. An electronic lock and key system comprising:

key means for establishing a binary permutation code having a predetermined number of information bits which may be electrically sensed;

means responsive to said key means for simultaneously transmitting said code in parallel to a plurality of output lines;

an AND gate having a plurality of inputs, each of which is connected to corresponding ones of said output lines and which is responsive to said binary permutation code to produce a first output signal;

an OR gate having a plurality of inputs, each of which is connected to a corresponding one of said output lines and which is responsive to a disparity in said binary permutation code carried on said key means to produce a second output signal;

an INHIBIT gate having its inputs connected to the output of said AND gate and the output of said OR gate, and responsive to the presence of said first output signal and the concurrent absence of said second output signal to produce a control signal indicative of a number of said information bits less than said predetermined number; and electrically actuated lock means connected to the output of said INHIBIT gate, and operative in response to said control signal for directly turning the system off.]

[2. An electronic lock and key system as defined in claim 1 including:

alarm means connected to the output of said OR gate and operative in response to the presence of said second output signal.]

[3. An electronic lock and key system as defined in claim 1 wherein said key means comprises:

an insulating key member adapted for engagement with said key responsive means; and a plurality of conductors spatially disposed on said insulating key member so as to correspond to said binary permutation code.]

[4. An electronic lock and key system as defined in claim 3 including:

a source of operating potential connected to said key responsive means for energizing said output lines via corresponding ones of said conductors.

[5. An electronic lock and key system as defined in claim 4 including:

a decoding matrix interposed between said key responsive means and the inputs to said AND gate and to said OR gate for directing said energizing potential to said plurality of inputs of said AND gate and said OR gate.]

[6. An electronic lock and key system comprising:

key means for establishing a permutation code including a predetermined number of information bits in the form of a set of open and closed circuit paths;

an AND gate for generating a first output signal in response to a given permutation code;

an OR gate for generating a second output signal in response to the presence of any circuit path additional to those circuit paths comprising said given permutation code constituting information bits in excess of said predetermined number;

means for engaging said key means to connect said set of circuit paths to said AND gate and to said OR gate;

an INHIBIT gate connected to said AND gate and responsive to said first output signal to produce a control signal indicative of a number of information bits less than said predetermined number, and also connected to said OR gate and responsive to said second output signal to inhibit said control signal; and electromechanical actuating means connected to said INHIBIT gate and operative in response to said control signal to directly terminate operation of the system.]

[7. An electronic lock and key system as defined in claim 6 wherein said key means comprises:

an insulating member adapted for engagement with said key engaging means; and a plurality of conductors spatially disposed on said insulating member so as to correspond to said given permutation code.]

[8. An electronic lock and key system as defined in claim 6 including:

a source of operating potential connected to said key engaging means for energizing said set of circuit paths.]

[9. An electronic lock and key system as defined in claim 8 including:

a decoding matrix interposed between said key engaging means and said AND gate and said OR gate, for directing said operating potential from said set of circuit paths to said gates.]

[10. An electronic lock and key system as defined in claim 8 including:

an alarm circuit connected to said OR gate so as to be energized therefrom by said second output signal.]

[11. An electronic lock and key system as defined in claim 8 including:

a door lock coupled to said electromechanical actuating means and adapted to unlock whenever said given permutation code is transmitted from said key engaging means.]

*12. A key-actuated electronic lock system comprising:*

*a key forming a proper key for the system and including a plurality of conductor paths in a proper binary code combination of closed and open circuits;*

*means for receiving said key, said means including a plurality of output leads connected to corresponding ones of closed and open circuits of said key when recived by said means;*

*an AND gate having a plurality of inputs each adapted to be energized by interconnection with a closed circuit of said proper key when received, said AND gate supplying an output signal when all of said inputs thereof are energized;*

*an OR gate havnig a plurality of inputs each adapted to be interconnected with an open circuit of said proper key when received by said receiving means and each adapted to be energized by interconnection with a closed circuit of an improper key that may be received, said OR gate supplying an output signal when one of said inputs thereof is energized;*

*a decoding matrix interconnecting ones of said leads with inputs of said AND and OR gates in accordance with said proper binary code combination of said proper key for causing energization of each of said AND gate inputs and none of said OR gate inputs by respective closed circuits of said proper key, and causing energization of an OR gate input by a closed circuit of an improper key having conductor paths not in said proper binary code combination;*

*an inhibit circuit interconnected with said AND gate and having an inhibit input interconnected with the output of said OR gate, said inhibit circuit being operative to inhibit said AND gate output signal in the presence of an output signal from said OR gate; and*

*electrically actuatable lock means, interconnected with sad inhibit circuit and operative in response to said AND gate output signal when said proper key is received by said receiving means.*

*13. A key-actuated electronic lock system as set forth in claim 12 further comprising means for simultaneously applying a supply voltage to each of said conductor paths whereby said closed circuits transmit said supply voltage through corresponding ones of said leads to said matrix.*

*14. A key-actuated electronic lock system as set forth in claim 13, wherin said means for simultaneously applying a supply voltage comprises a common conductor on said key for commonly connecting said conductor paths, and said means for receiving said key includes a conductor for applying the supply voltage to said common conductor.*

*15. A key-actuated electronic security system comprising:*

*a key including a plurality of conductor paths in a binary code combination of closed and open circuits;*

*means for receiving said key, said means including a plurality of output leads connected to corresponding ones of closed and open circuits of said key when received by said means;*

*an AND gate having a plurality of inputs and adapted to supply an output signal when interconnection of said inputs with key circuits energizes all of said inputs;*

*an OR gate having a plurality of inputs and adapted to supply an output signal when interconnection of said inputs therof with key circuits energizes one of said inputs thereof;*

*a decoding matrix interconnecting ones of said leads of the key receiving means with inputs of said AND and OR gates in accordance with a preselected binary code combination for causing energization of all of said AND gate inputs by respective closed circuits of said key when said key has said preselected binary code combniation and for causing energization of an OR gate input by a closed circuit of said key when said key does not have said preselected binary code combination;*

*an inhibit circuit interconnected with said AND gate and having an inhibit input interconnected with the output of said OR gate, said inhibit circuit being operative to inhibit said AND gate output signal in the presence of an output signal from said OR gate; and*

*electrically actuatable means for responding to said AND gate output signal when not inhibited to indicate when said key, when received, has said preselected binary code combination.*

*16. Apparatus for use in an electronic key-actuated security system including keys each constituted by a plurality of circuit paths establishing a binary code permutation, said apparatus comprising:*

*means for receiving a key, said means including a plurality of conductors for providing connections with corresponding ones of said circuit paths;*

*an AND gate having a plurality of inputs each adapted to be energized by interconnection with circuit paths of a key received, said AND gate supplying an output signal when all of said inputs thereof are energized;*

*an OR gate having a plurality of inputs each adapted to be energized by interconnection with circuit paths of a key received, said OR gate supplying an output signal when any of said inputs thereof are energized;*

*means for interconnecting ones of said conductors with inputs of said AND and OR gates in accordance with a preselected binary code permutation for causing energization of each of said AND gate inputs and none of said OR gate inputs by interconnection with circuit paths of a key received having circuit paths defining said preselected binary code permutation, but causing energization of an OR gate input by interconnection with a circuit path of a key received having circuit paths not defining said preselected binary code permutation;*

*an inhibit circuit interconnected with said AND gate and having an inhibit input interconnected with the output of said OR gate, said inhibit circuit being operatve to inhibit said AND gate output signal in the presence of an output signal from said OR gate; and*

*electrically actuatable means for responding to said AND gate output signal when not inhibited to indicate the receiving a key having circuit paths defining said preselected binary code permutation.*

*17. Apparatus as set forth in claim 16, wherein said means for interconnecting ones of said conductors with said AND and OR gates comprises a decoding matrix.*

*18. Apparatus as set forth in claim 16, further comprising alarm means interconnected with said OR gate and operative in response to an output signal therefrom for giving an alarm.*

*19. Apparatus as set forth in claim 16, wherein said electrically actuatable means for responding to said AND gate output signal comprises an electric lock.*

*20. In a key-actuated electronic security system including apparatus responsive to a binary code permutation of closed and open circuits, and key receiving means having a plurality of contacts, a key, said key comprising an electrically non-conductive member having a side surface extending toward an edge portion that is receivable by said key receiving means, a plurality of electrically conductive members mounted in spaced relation to one another on said surface of the non-conductive member, each of said conductive members extending across a portion of said surface toward said edge portion of the non-conductive member, for engaging said contacts and having ends relatively remote said edge portion, and a further conductive member extending transversely across all of said remote ends generally parallel to said edge, said further conductive member connecting electrically in common with one another some of said relatively remote ends so as to provide said key with a binary code permutation of closed and open circuits through respective ones of said conductive members.*

*21. In a key-actuated electronic security system as set forth in claim 20, said side surface of said electrically non-conductive member being generally planar.*

*22. In a key-actuated electronic security system as set forth in claim 20, said conductive members extending across said surface in generally parallel relationship substantially at right angles to said edge.*

*23. In a key-actuated electronic security system as set forth in claim 22, said conductive members being relatively thin, flat strips.*

*24. In a key-actuated electronic security system as set forth in claim 20, each remote end connected electrically in common with other remote ends by said further conductive member providing a closed circuit and each remote end not connected electrically in common with other remote ends by said further conductor providing an open circuit thereby to provide said key with said binary code permutation of closed and open circuits.*

*25. In a key-actuated electronic security system as set forth in claim 20, means for obscuring at least a portion of each of said conductive members to conceal which of said conductor members are and which are not connected to said further conductive member.*

*26. In a key-actuated electronic security system as set forth in claim 25, said obscuring means comprising a layer of electrically non-conductive and opaque material overlying said side surface.*

*27. A key means for use in a key-actuated electronic security system including apparatus responsive to a binary code permutation of closed and open circuits and key receiving means having a plurality of contacts, said key means comprising an electrically non-conductive member having a side surface extending toward an edge portion that is receivable by said key receiving means, a plurality of electrically conductive members mounted in spaced relation to one another on said surface of the nonconductive member, each of said conductive members extending across a portion of said surface toward said edge portion of the non-conductive member for engaging said contacts and having ends relatively remote from said edge portion, a further conductive member extending tarnsversely across all of said remote ends generally parallel to said edge, said further conductive member commonly electrically connecting said relatively remote ends, each of the first said conductive members including a portion adapted to be removed, each of the remote ends that are commonly connected by said further conductive members adapted to provide a closed circuit and each of said conductive members when having a portion removed being in open circuit relation to said remote ends of other conductive members so as to provide a key with a binary code permutation of closed and open circuits through respective ones of said conductive members, and means for obscuring at least a portion of each of said conductive members to conceal*

*which of said conductive members are and which are not connected to said further conductive member.*

References Cited

The following references, cited by the Examiner, are of record in the patented file of this patent or the original patent.

UNITED STATES PATENTS

| | | | |
|---|---|---|---|
| 2,937,357 | 5/1960 | Kennedy | 339—17 |
| 3,093,994 | 6/1963 | Richard | 70—434 |
| 3,134,254 | 5/1964 | Richard | 70—277 |

| | | | |
|---|---|---|---|
| 3,160,792 | 12/1964 | Brendemuehl | 317—134 |
| 3,200,360 | 8/1965 | McKiel | 339—17 |
| 3,320,490 | 5/1967 | Beck | 317—134 |
| 3,441,808 | 4/1969 | Crane | 317—134 |
| 3,134,961 | 5/1964 | Clark | 340—164 |

STEPHEN J. NOVOSAD, Primary Examiner

E. J. McCARTHY, Assistant Examiner

U.S. Cl. X.R.

70—434; 307—40; 317—134